US010401718B2

(12) United States Patent
Egawa

(10) Patent No.: US 10,401,718 B2
(45) Date of Patent: Sep. 3, 2019

(54) ROTARY COOLING DEVICE, WAVELENGTH CONVERSION DEVICE, LIGHT DIFFUSING DEVICE, LIGHT SOURCE DEVICE, AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/709,918

(22) Filed: Sep. 20, 2017

(65) Prior Publication Data

US 2018/0095349 A1 Apr. 5, 2018

(30) Foreign Application Priority Data

Sep. 30, 2016 (JP) .................................. 2016-192985

(51) Int. Cl.
| G03B 21/16 | (2006.01) |
| H04N 9/31 | (2006.01) |
| G02B 26/00 | (2006.01) |
| G03B 21/20 | (2006.01) |

(52) U.S. Cl.
CPC ........... *G03B 21/16* (2013.01); *G02B 26/008* (2013.01); *H04N 9/3105* (2013.01); *H04N 9/3144* (2013.01); *H04N 9/3158* (2013.01); *G03B 21/204* (2013.01)

(58) Field of Classification Search
CPC ..... H01L 23/467; G02B 7/008; G02B 26/008; G03B 21/16
See application file for complete search history.

(56) References Cited

U.S. PATENT DOCUMENTS

| 5,986,809 A | 11/1999 | Itoh et al. | |
| 7,018,051 B2* | 3/2006 | Bok | G03B 21/16 |
| | | | 348/743 |
| 2011/0123318 A1* | 5/2011 | Khanna | F04D 25/04 |
| | | | 415/177 |
| 2015/0215569 A1* | 7/2015 | Li | G09G 5/02 |
| | | | 348/760 |

(Continued)

FOREIGN PATENT DOCUMENTS

| CN | 1196802 A | 10/1998 |
| JP | 2012-013897 A | 1/2012 |

(Continued)

*Primary Examiner* — Eric S Ruppert
(74) *Attorney, Agent, or Firm* — Oliff PLC

(57) ABSTRACT

A rotary cooling device includes a rotating device, a base connected to a cooling target and configured to be rotated by the rotating device, and a heat radiating section disposed in the base and configured to radiate heat transmitted from the cooling target via the base. The heat radiating section includes a plurality of fins extending from a rotation center side of the base to an outer circumference side of the base and arrayed along a rotating direction of the base, a plurality of first grooves formed among the plurality of fins and communicating with an outer region of the heat radiating section when viewed along a rotation axis of the base, and a plurality of second grooves crossing at least one of the plurality of first grooves to divide the plurality of fins into a plurality of fin elements.

18 Claims, 9 Drawing Sheets

(56) References Cited

U.S. PATENT DOCUMENTS

| | | | |
|---|---|---|---|
| 2017/0099467 A1* | 4/2017 | Egawa | G02B 26/008 |
| 2018/0031957 A1* | 2/2018 | Egawa | G02B 26/008 |
| 2018/0095348 A1* | 4/2018 | Asano | G03B 21/00 |

FOREIGN PATENT DOCUMENTS

| | | |
|---|---|---|
| JP | 2012-181431 A | 9/2012 |
| JP | 2017-073244 A | 4/2017 |

\* cited by examiner

ROTARY COOLING DEVICE, WAVELENGTH CONVERSION DEVICE, LIGHT DIFFUSING DEVICE, LIGHT SOURCE DEVICE, AND PROJECTOR

BACKGROUND

1. Technical Field

The present invention relates to a rotary cooling device, a wavelength conversion device, a light diffusing device, a light source device, and a projector.

2. Related Art

There has been known a projector including a light source device, a light modulating device that modulates light emitted from the light source device and forms an image corresponding to image information, and a projection optical device that enlarges and projects the formed image on a projection surface such as a screen. As the light source device used in such a projector, there is known a light source device including a semiconductor laser and a reflection-type color wheel (see, for example, JP-A-2012-13897 (Patent Literature 1)).

In the projector described in Patent Literature 1, the reflection-type color wheel includes a substrate rotated by a motor functioning as a rotating mechanism. One surface applied with mirror-surface treatment in the substrate is divided into a plurality of segments at an interval of 2 degrees. In the segments, phosphor layers excited by excitation lights made incident from the semiconductor laser to respectively emit red light, green light, and blue light are formed in order along a rotating direction of the substrate. The substrate is rotated and the phosphor layers on which the excitations are made incident are sequentially switched, whereby the color lights are sequentially emitted.

The phosphor layers in the reflection-type color wheel generate heat according to the incidence of the excitation lights. On the other hand, if temperature is excessively high, heat saturation occurs and wavelength conversion efficiency of the excitation light decreases. For this reason, in the reflection-type color wheel, a plurality of fins functioning as a heating radiating section are integrally formed on the rear surface in the substrate. Examples of the fins include a plurality of fins formed in a concentric shape centering on the rotation center of the substrate, a plurality of fins formed in a radial shape centering on the rotation center, and a plurality of fins formed in a spiral shape centering on the rotation center.

However, in the reflection-type color wheel described in Patent Literature 1 including the plurality of fins formed in the concentric shape, diffusion of the air (hot air) by a centrifugal force less easily occurs. For this reason, the air easily accumulates among the fins.

In the reflection-type color wheel including the plurality of fins formed in the radial shape or the plurality of fins formed in the spiral shape, the air circulating among the fins circulates at relatively high speed. For this reason, it is likely that the fins are not sufficiently cooled and heat accumulates in the fins.

From these problems, there has been demanded a configuration that can improve cooling efficiency of a cooling target.

SUMMARY

An advantage of some aspects of the invention is to provide a rotary cooling device, a wavelength conversion device, a light diffusing device, a light source device, and a projector that can improve cooling efficiency of a cooling target.

A rotary cooling device according to an aspect of the invention includes: a rotating device; a base connected to a cooling target and configured to be rotated by the rotating device; and a heat radiating section disposed in the base and configured to radiate heat transmitted from the cooling target via the base. The heat radiating section includes: a plurality of fins extending from a rotation center side of the base to an outer circumference side of the base and arrayed along a rotating direction of the base; a plurality of first grooves formed among the plurality of fins and communicating with an outer region of the heat radiating section when viewed along a rotation axis of the base; and a plurality of second grooves crossing at least one of the plurality of first grooves to divide the plurality of fins into a plurality of fin elements.

According to the first aspect, the plurality of fins extending from the rotation center side of the base to the outer circumference side of the base are divided into the plurality of fin elements by the plurality of second grooves that cross at least any one of the plurality of first grooves formed among the plurality of fins. Consequently, when the base is rotated by the rotating device, in a process in which a cooling gas circulates along the first grooves and is discharged to the outer region of the heat radiating section, a part of the cooling gas circulates along the second grooves. For this reason, compared with when the second grooves are absent, it is possible to make it easy to increase a contact area of the fins and the cooling gas. Besides, since the fins are divided by the second grooves extending along the thickness direction (a direction along the rotating direction of the base) of the fins, the cooling gas circulating in the second grooves circulates along the thickness direction. It is possible to prevent heat from accumulating in the fins. Therefore, it is possible to improve cooling efficiency of the heat radiating section to which the heat of the cooling target is transmitted. Further, it is possible to improve cooling efficiency of the cooling target.

In the first aspect, it is preferable that the plurality of fins are disposed at substantially equal intervals along the rotating direction and have a shape further warping in an opposite direction of the rotating direction from the rotation center side toward the outer circumference side of the base.

With such a configuration, since the plurality of fins are disposed at the substantially equal intervals along the rotating direction, it is possible to dispose, at substantially equal intervals, the first grooves in which the cooling gas circulates. For this reason, it is possible to prevent deviation from occurring in a cooling state in the heat radiating section.

Since the fins have the shape explained above, the fin elements less easily cross the rotating direction at right angles. Therefore, it is possible to reduce wind noise caused by collision of the fin elements and the cooling gas. Besides, it is possible to reduce rotational resistance of the base and the heat radiating section. Therefore, it is possible to reduce a load on the rotating device.

A rotary cooling device according to a second aspect of the invention includes: a rotating device; a base connected to a cooling target and configured to be rotated by the rotating device; and a heat radiating section disposed in the base and configured to radiate heat transmitted from the cooling target via the base. The heat radiating section includes: a plurality of first grooves extending from a rotation center side of the base to an outer circumference side of the base, arrayed along a rotating direction of the base, and communicating with an outer region of the heat radiating section when viewed along a rotation axis of the base; a plurality of second grooves crossing at least one of the plurality of first grooves; and a plurality of fin elements divided by the plurality of first grooves and the plurality of second grooves.

According to the second aspect, it is possible to achieve the same effects as the effects of the rotary cooling device according to the first aspect.

That is, in a process in which the base is rotated by the rotating device and a cooling gas circulates along the first grooves and is discharged to the outer region of the heat radiating section, a part of the cooling gas circulates along the second grooves that cross the first grooves. Consequently, compared with when the second grooves are absent, it is possible to make it easy to increase a contact area of the fin elements and the cooling gas. Besides, since the cooling gas circulating in the second grooves circulates along the thickness direction of the fin elements, it is possible to prevent heat from accumulating in the fin elements. Therefore, it is possible to improve cooling efficiency of the heat radiating section to which the heat of the cooling target is transmitted. Further, it is possible to improve cooling efficiency of the cooling target.

In the second aspect, it is preferable that the plurality of first grooves are disposed at substantially equal intervals along the rotating direction and have a shape further warping in an opposite direction of the rotating direction from the rotation center side toward the outer circumference side of the base.

With such a configuration, since the plurality of first grooves in which the cooling gas circulates are disposed at the substantially equal intervals along the rotating direction, it is possible to prevent deviation from occurring in a cooling state in the heat radiating section.

Since the plurality of first grooves have the shape explained above, the fin elements also have a shape further warping in the opposite direction of the rotating direction from the rotation center side toward the outer circumference side. For this reason, since the fin elements less easily cross the rotating direction at right angles, it is possible to reduce wind noise caused by collision of the fin elements and the cooling gas. Besides, it is possible to reduce rotational resistance of the base and the heat radiating section. Therefore, it is possible to reduce a load on the rotating device.

In the first and second aspects, it is preferable that the plurality of second grooves extend from the rotation center side to the outer circumference side of the base and communicate with the outer region.

With such a configuration, when the base is rotated, it is possible to make it easy to circulate, along the second grooves, the cooling gas circulating from the rotation center side to the outer circumference side. Since the plurality of second grooves communicate with the outer region, it is possible to make it easy to discharge, to the outside (the outer region) of the heat radiating section, the cooling gas circulating along the plurality of second grooves.

Therefore, since it is possible to prevent the cooling gas, which absorbs heat from the heat radiating section, from being held up in the heat radiating section. Therefore, it is possible to improve cooling efficiency of the heat radiating section and the cooling target.

In the first and second aspects, it is preferable that the plurality of first grooves and the plurality of second grooves are formed rotation-symmetrically around the rotation center.

With such a configuration, it is possible to prevent the center of gravity of the base and the heat radiating section from deviating from the rotation center. Therefore, it is possible to reduce rotational resistance of the base and the heat radiating section. It is possible to reduce a load on the rotating device.

In the first and second aspects, it is preferable that a groove width of the plurality of first grooves is larger than a groove width of the plurality of second grooves.

With such a configuration, the cooling gas circulates using, as a main channel, the first grooves communicating with the outer region of the heat radiating section. Consequently, it is possible to surely discharge the cooling gas, which cools the fin elements, to the outside (the outer region) of the heat radiating section. Therefore, it is possible to surely prevent the cooling gas, which absorbs heat from the heat radiating section, from being held up in the heat radiating section. Further, it is possible to improve cooling efficiency of the heat radiating section and the cooling target.

In the first and second aspects, it is preferable that an end portion on the rotation center side and on an inner circumference side of the heat radiating section among end portions of each of the plurality of fin elements is formed with a first end edge which forms one of the plurality of first grooves and a second end edge which forms one of the plurality of second grooves. And the first end edge and the second end edge are crossing at an acute angle.

With such a configuration, since the cooling gas collides with the end portion, which is the corner portion of the acute angle, it is possible to make it easy to cool the end portion. Therefore, it is possible to effectively cool the fin elements.

If the end edges forming the end portion cross at an obtuse angle, the cooling gas circulating in the first grooves and colliding with the end portion less easily flows into the second grooves. For this reason, the cooling gas is easily held up near the end portion. It is likely that the cooling gas is less easily quickly circulated.

On the other hand, since the end edges forming the end portion cross at the acute angle, it is possible to make it easy to divert the cooling gas colliding with the end portion to the first grooves and the second grooves. For this reason, it is possible to make it easy to circulate the cooling gas along not only the end portion but also the entire fin element. It is possible to effectively cool the fin element. Therefore, it is possible to improve cooling efficiency of the cooling target.

A wavelength conversion device according to a third aspect of the invention includes: the rotary cooling device; and a wavelength conversion element connected to the base as the cooling target and configured to convert a wavelength of light incident on the wavelength conversion element.

According to the third aspect, it is possible to achieve the same effects as the effects of the rotary cooling devices according to the first and second aspects. Since cooling efficiency of the wavelength conversion element, which is the cooling target, is improved, it is possible to prevent heat saturation from occurring in the wavelength conversion element. It is possible to configure the wavelength conversion device capable of stably emitting light. Besides, it is possible to achieve an extension of the life of the wavelength conversion device (the wavelength conversion element).

A light source device according to a fourth aspect of the invention includes: the wavelength conversion device; and a light emitting device configured to emit light incident on the wavelength conversion element.

According to the fourth aspect, it is possible to achieve the same effects as the effects of the wavelength conversion device according to the third aspect. Therefore, it is possible to configure the light source device capable of stably emitting light. Besides, it is possible to achieve an extension of the life of the light source device.

A light diffusing device according to a fifth aspect of the invention includes: the rotary cooling device; and a light diffusing element connected to the base as the cooling target and configured to diffuse light incident on the light diffusing element.

According to the fifth aspect, it is possible to achieve the same effects as the effects of the rotary cooling devices according to the first and second aspects. Since cooling efficiency of the light diffusing element, which is the cooling target, is improved, it is possible to prevent deterioration due to heat. It is possible to achieve an extension of the life of the light diffusing device (the light diffusing element).

A light source device according to a sixth aspect of the invention includes: the light diffusing device; and a light emitting device configured to emit light incident on the light diffusing element.

According to the sixth aspect, it is possible to achieve the same effects as the effects of the light diffusing device according to the fifth aspect. Therefore, it is possible to configure the light source device capable of stably emitting light. Besides, it is possible to achieve an extension of the life of the light source device.

A projector according to a seventh aspect of the invention includes: the light source device; a light modulating device configured to modulate light emitted from the light source device; and a projection optical device configured to project the light modulated by the light modulating device.

According to the seventh aspect, it is possible to achieve the same effects as the effects of the light source devices according to the fourth and sixth aspects.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained below with reference to the drawings.

Schematic Configuration of a Projector

Figure 1:
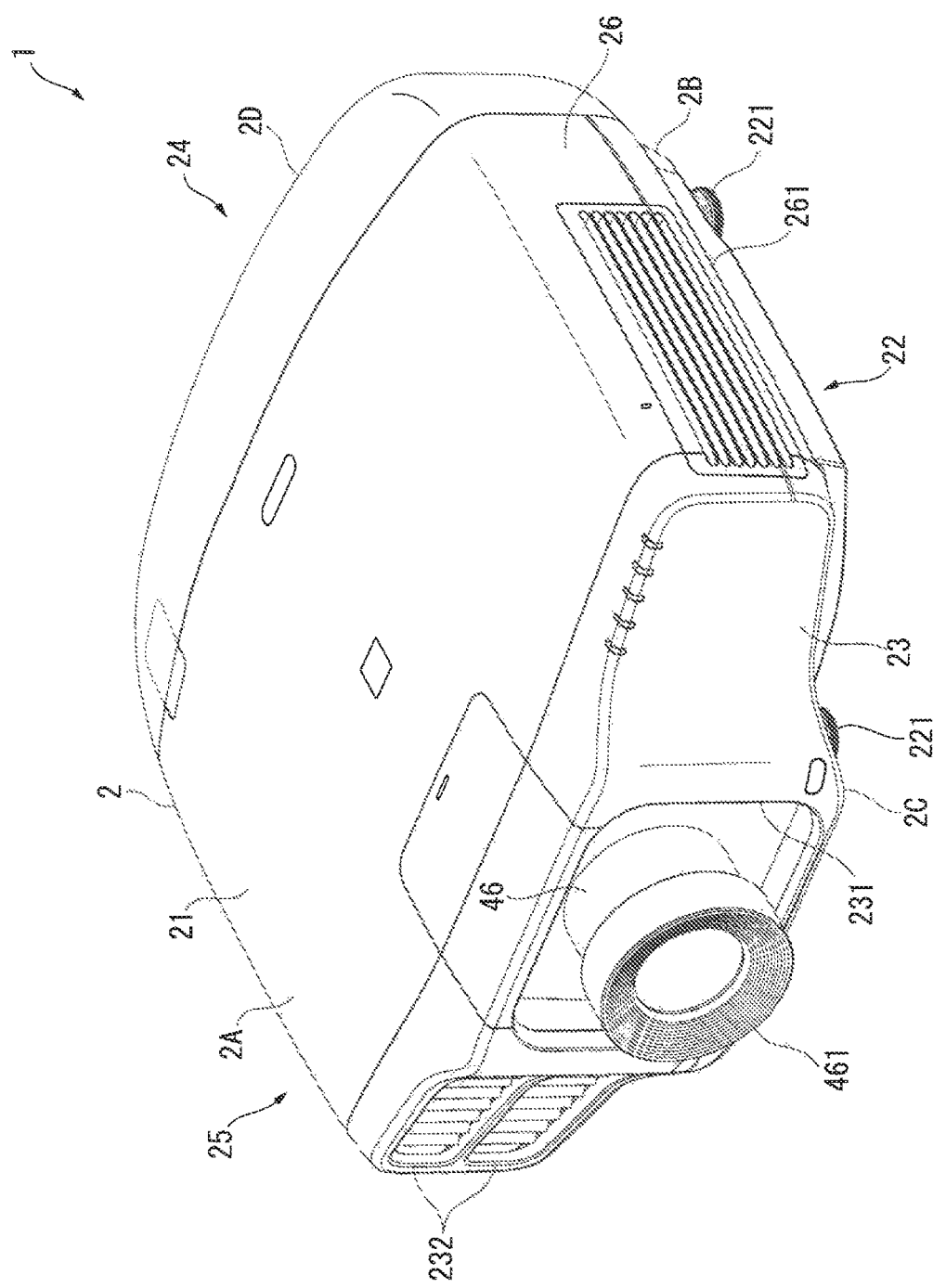
FIG. 1 is a perspective view showing the exterior of a projector according to an embodiment of the invention.

FIG. 1 is a perspective view showing the exterior of a projector 1 according to this embodiment.

The projector 1 according to this embodiment is a projection-type image display apparatus that modulates light emitted from a light source device 5 explained below, forms an image corresponding to image information, and enlarges and projects the formed image on a projection surface PS (see FIG. 2) such as a screen. The projector 1 includes, as shown in FIG. 1, an exterior housing 2 configuring the exterior and an apparatus main body 3 (see FIG. 2).

As explained in detail with reference to FIG. 5, as one of characteristics of the projector 1, a plurality of fins 671 included in a rotary cooling device 62 are divided into a plurality of fin elements 672 by a plurality of second grooves 674 that cross first grooves 673 formed among the plurality of fins 671.

The configuration of the projector 1 is explained below.

Configuration of the Exterior Housing

The exterior housing 2 is formed in a substantially rectangular parallelepiped shape by combining an upper case 2A, a lower case 2B, a front case 2C, and a rear case 2D. The exterior housing 2 includes a top surface section 21, a bottom surface section 22, a front surface section 23, a back surface section 24, a left side surface section 25, and a right side surface section 26.

On the bottom surface section 22, leg sections 221 (only two leg sections 221 are shown in FIG. 1), which are in contact with a placing surface when the projector 1 is placed on the placing surface, are provided in a plurality of places.

In the center portion of the front surface section 23, an opening section 231, which exposes an end portion 461 of a projection optical device 46 explained below and through which an image projected by the projection optical device 46 passes, is formed.

In a position on the left side surface section 25 side in the front surface section 23, exhaust ports 232, from which a cooling gas in the exterior housing 2 is discharged, is formed.

In the right side surface section 26, an introducing port 261 for introducing the external air into the inside as a cooling gas is formed.

Configuration of the Apparatus Main Body

Figure 2:
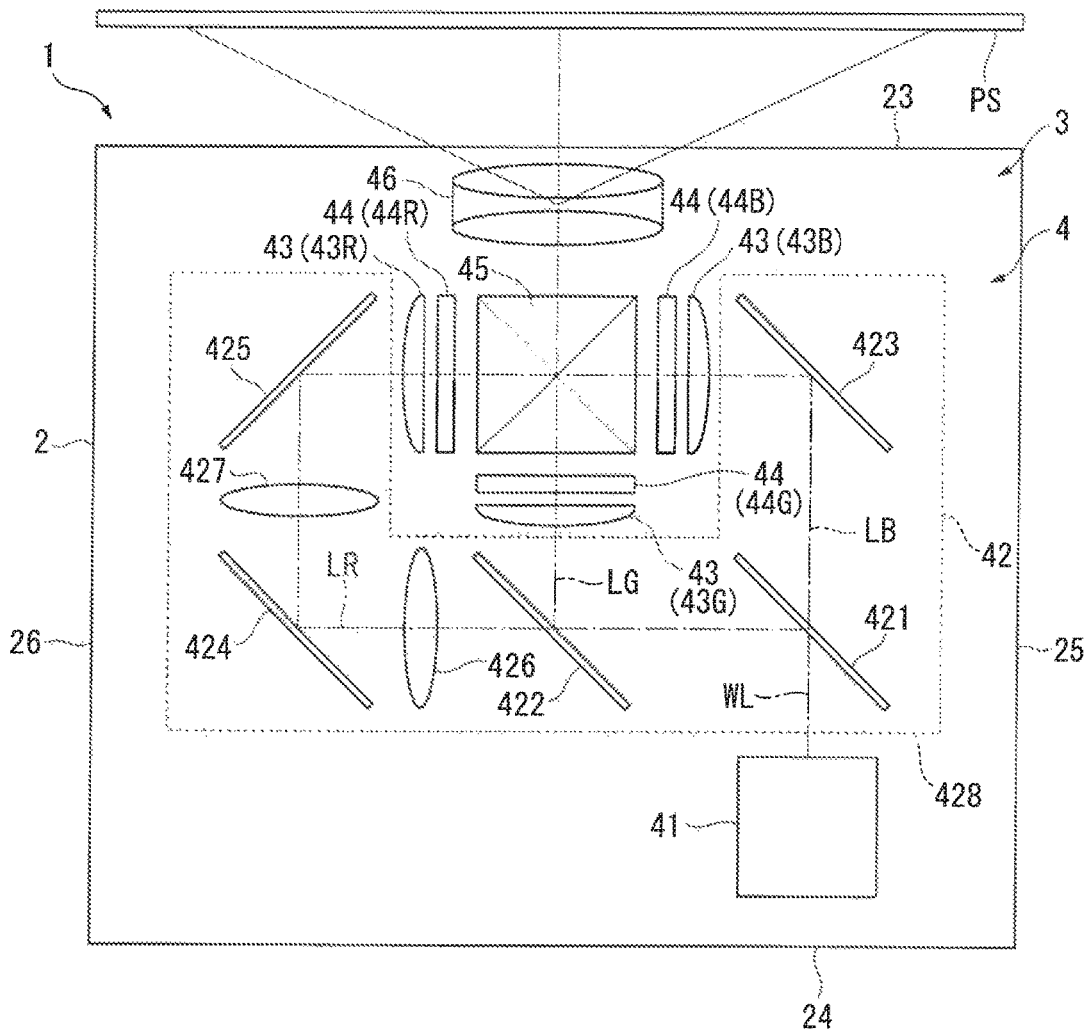
FIG. 2 is a schematic diagram showing the configuration of an apparatus main body in the embodiment.

FIG. 2 is a schematic diagram showing the configuration of the apparatus main body 3.

As shown in FIG. 2, the apparatus main body 3 is housed in the exterior housing 2. The apparatus main body 3 includes an image projection device 4. Besides, although not shown in the figure, the apparatus main body 3 includes a control device that controls the operation of the projector 1, a power supply device that supplies electric power to electronic components configuring the projector 1, and a cooling device that cools a cooling target.

Configuration of the Image Projection Device

The image projection device 4 forms an image corresponding to an image signal input from the control device and projects the image on the projection surface PS. The image projection device 4 includes an illuminating device 41, a color separating device 42, collimating lenses 43, light modulating devices 44, a color combining device 45, and a projection optical device 46.

The illuminating device 41 emits illumination light WL for uniformly illuminating the light modulating devices 44. The illuminating device 41 emits the illumination light WL toward the color separating device 42. The configuration of the illuminating device 41 is explained in detail below.

The color separating device 42 separates blue light LB, green light LG, and red light LR from the illumination light WL made incident from the illuminating device 41. The color separating device 42 includes dichroic mirrors 421 and 422, reflection mirrors 423, 424, and 425, relay lenses 426 and 427, and a housing for optical components 428 that houses the foregoing on the inside.

The dichroic mirror 421 transmits the blue light LB included in the illumination light WL and reflects the green light LG and the red light LR. The blue light LB transmitted through the dichroic mirror 421 is reflected on the reflection mirror 423 and guided to the collimating lens 43 (a collimating lens for blue light 43B).

The dichroic mirror 422 reflects the green light LG of the green light LG and the red light LR reflected on the dichroic mirror 421, guides the green light LG to the collimating lens 43 (a collimating lens for green light 43G), and transmits the red light LR. The red light LR is guided to the collimating lens 43 (a collimating lens for red light 43R) by the relay lens 426, the reflection mirror 424, the relay lens 427, and the reflection mirror 425.

The collimating lenses 43 (43R, 43G, and 43B) collimate lights made incident on the collimating lenses 43.

The light modulating devices 44 (light modulating devices for color lights of red, green, and blue are respectively represented as 44R, 44G, and 44B) respectively modulate the color lights LR, LG, and LB made incident on the light modulating devices 44 and form images based on the color lights LR, LG, and LB corresponding to image signals input from the control device. Each of the light modulating devices 44 includes, for example, a liquid crystal panel that modulates light made incident on the liquid crystal panel and sheet polarizers respectively disposed on an incident side and an emission side of the liquid crystal panel.

The color combining device 45 combines images (images based on the color lights LR, LG, and LB) made incident from the light modulating devices 44R, 44G, and 44B. In this embodiment, the color combining device 45 is configured by a cross dichroic prism. However, the color combining device 45 can also be configured by a plurality of dichroic mirrors.

The projection optical device 46 enlarges and projects an image combined by the color combining device 45 on the projection surface PS. As the projection optical device 46, for example, a set lens configured by a lens barrel and a plurality of lenses disposed in the lens barrel can be adopted.

Configuration of the Illuminating Device

Figure 3:
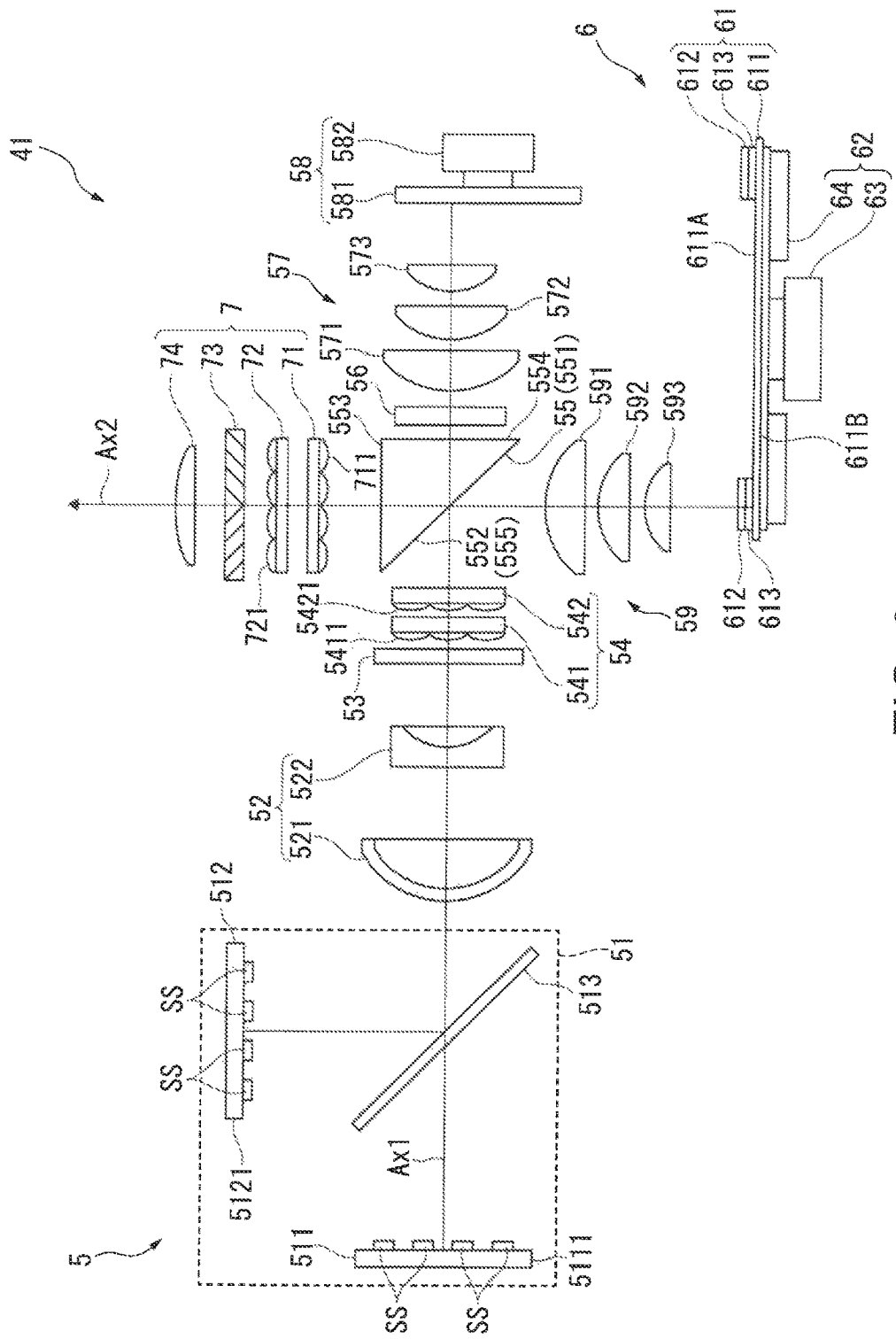
FIG. 3 is a schematic diagram showing the configuration of an illuminating device in the embodiment.

FIG. 3 is a schematic diagram showing the configuration of the illuminating device 41.

As explained above, the illuminating device 41 emits the illumination light WL toward the color separating device 42. The illuminating device 41 includes, as shown in FIG. 3, a light source device 5 and an equalizing device 7.

Configuration of the Light Source Device

The light source device 5 emits a light beam (the illumination light WL) to the equalizing device 7. The light source device 5 includes a light source section 51, an afocal optical element 52, a first phase difference element 53, a homogenizer optical device 54, a light combining device 55, a second phase difference element 56, a first light condensing element 57, a light diffusing device 58, a second light condensing element 59, and a wavelength conversion device 6.

The light source section 51, the afocal optical element 52, the first phase difference element 53, the homogenizer optical device 54, the second phase difference element 56, the first light condensing element 57, and the light diffusing device 58 are disposed on a first illumination optical axis Ax1. On the other hand, the second light condensing element 59, the wavelength conversion device 6, and the equalizing device 7 are disposed on a second illumination optical axis Ax2 crossing the first illumination optical axis Ax1. The light combining device 55 is disposed in a crossing portion of the first illumination optical axis Ax1 and the second illumination optical axis Ax2.

Configuration of the Light Source Section

The light source section 51 is a light emitting device that emits excitation light, which is blue light. The light source section 51 includes a first light source section 511, a second light source section 512, and a light combining member 513.

The first light source section 511 includes a solid-state light source array 5111 in which a plurality of solid-state light sources SS, which are LDs (Laser Diodes), are arrayed in a matrix shape and a plurality of collimating lenses (not shown in the figure) corresponding to the solid-state light sources SS. Similarly, the second light source section 512 includes a solid-state light source array 5121 in which a plurality of solid-state light sources SS are arrayed in a matrix shape and a plurality of collimating lenses (not shown in the figure) corresponding to the solid-state light sources SS. The solid-state light sources SS emits, for example, excitation lights having a peak wavelength of 440 nm. However, the solid-state light sources SS may emit excitation lights having a peak wavelength of 446 nm and excitation lights having a peak wavelength of 460 nm. Solid-state light sources that respectively emit excitation lights having different peak wavelengths may be mixed in the light source sections 511 and 512. The excitation lights emitted from the solid-state light sources SS are collimated by collimating lenses (collimator lenses) and made incident on the light combining member 513.

Note that, in this embodiment, the excitation lights emitted from the solid-state light sources SS are s polarized lights. However, not only this, but the solid-state light sources SS that emit the excitation lights of the s polarized lights and the solid-state light source SS that emits excitation lights of p polarized lights may be mixed. In this case, the first phase difference element 53 explained below can be omitted.

The light combining member 513 transmits excitation lights emitted from the first light source section 511 along the first illumination optical axis Ax1, reflects, along the first illumination optical axis Ax1, excitation lights emitted from the second light source section 512 along a direction crossing the first illumination optical axis Ax1, and combines the excitation lights. In this embodiment, the light combining member 513 is configured as a tabular body in which a plurality of passage sections that allow the excitation lights from the first light source section 511 to pass and a plurality of reflecting sections that reflect the excitation lights from the second light source section 512 are alternately arrayed. The excitation lights combined via the light combining member 513 are made incident on the afocal optical element 52.

Note that, in this embodiment, the light source section 51 functioning as the light emitting device includes the first light source section 511, the second light source section 512, and the light combining member 513. However, not only this, but the light source section 51 may include only the first light source section 511 or may include a larger number of light source sections.

Configuration of the Afocal Optical Element

The afocal optical element 52 adjusts (reduces) a light beam diameter of the excitation lights made incident from the light source section 51. Specifically, the afocal optical element 52 includes a lens 521 that condenses the excitation lights made incident from the light source section 51 as parallel lights and reduces a light beam diameter and a lens 522 that collimates and emits the excitation lights made incident from the lens 521.

Configuration of the First Phase Difference Element

The first phase difference element 53 is a half wavelength plate. By passing through the first phase difference element 53, the excitation lights of the s polarized lights made incident from the afocal optical element 52 are partially converted into the excitation lights of the p polarized lights to change to excitation lights in which the s polarized lights and the p polarized lights are mixed. Such excitation lights are made incident on the homogenizer optical device 54.

Configuration of the Homogenizer Optical Device

The homogenizer optical device 54 equalizes an illuminance distribution of excitation lights made incident on illuminated regions in the light diffusing device 58 and the wavelength conversion device 6. The excitation lights passed through the homogenizer optical device 54 are made incident on the light combining device 55. The homogenizer optical device 54 includes a first multi-lens 541 and a second multi-lens 542.

The first multi-lens 541 has a configuration in which a plurality of first lenses 5411 are arrayed in a matrix shape in a plane orthogonal to the first illumination optical axis Ax1. The first multi-lens 541 divides excitation light made incident on the first multi-lens 541 into a plurality of partial light beams.

The second multi-lens 542 has a configuration in which a plurality of second lenses 5421 corresponding to a plurality of the first lenses are arrayed in a matrix shape in a plane orthogonal to the first illumination optical axis Ax1. The second multi-lens 542 superimposes the divided plurality of partial light beams on the illuminated regions in cooperation with the second lenses 5421 and the light condensing elements 57 and 59. Consequently, the illuminance in a plane orthogonal to the center axis of the excitation lights made incident on the illuminated regions is equalized.

Note that the homogenizer optical device 54 may be disposed between the afocal optical element 52 and the first phase difference element 53.

Configuration of the Light Combining Device

The light combining device 55 is a PBS (Polarizing Beam Splitter) including a prism 551 formed in a substantially rectangular isosceles triangular pole shape. A surface 552 corresponding to a hypotenuse inclines at approximately 45° with respect to each of the first illumination optical axis Ax1 and the second illumination optical axis Ax2. Of surfaces 553 and 554 corresponding to adjacent sides, the surface 553 crosses the second illumination optical axis Ax2 and the surface 554 crosses the first illumination optical axis Ax1. Among the surfaces 552 to 554, a polarization separation layer 555 having wavelength selectivity is formed on the surface 552.

The polarization separation layer 555 has a characteristic of separating s polarized lights and p polarized lights included in excitation lights made incident on the polarization separation layer 555. Besides, the polarization separation layer 555 has a characteristic of allowing fluorescent light generated by the wavelength conversion device 6 to pass irrespective of a polarization state of the fluorescent light. That is, the polarization separation layer 555 has a polarization separation characteristic of the wavelength selectivity for separating s polarized light and p polarized light concerning light having a wavelength in a blue light region but allowing each of s polarized lights and p polarized lights to pass concerning lights having wavelengths in a green light region and a red light region.

With the light combining device 55 functioning as the light separating device as well in this way, in the excitation lights made incident from the homogenizer optical device 54, the p polarized lights are allowed to pass to the second phase difference element 56 side along the first illumination optical axis Ax1 and the s polarized lights are reflected to the second light condensing element 59 side along the second illumination optical axis Ax2.

As explained below in detail, the light combining device 55 combines the excitation light (the blue light) made incident via the second phase difference element 56 and the fluorescent light made incident via the second light condensing element 59.

Configuration of the Second Phase Difference Element

The second phase difference element 56 is a quarter wavelength plate. The second phase difference element 56 converts excitation light of p polarized light made incident from the light combining device 55 into excitation light of circularly polarized light and converts excitation light (circularly polarized light circling reversely to the circularly polarized light) made incident from the first light condensing element 57 into s polarized light.

Configuration of the First Light Condensing Element

The first light condensing element 57 is an optical element that condenses (converges) excitation lights passed through the second phase difference element 56 on the light diffusing device 58. In this embodiment, the first light condensing element 57 is configured by three pickup lenses 571 to 573. However, the number of lenses configuring the first light condensing element 57 is not limited to three.

Configuration of the Light Diffusing Device

The light diffusing device 58 diffuses, at the same diffusion angle as the diffusion angle of the fluorescent light generated and emitted by the wavelength conversion device 6, excitation light made incident on the light diffusing device 58. The light diffusing device 58 includes a disk-like light diffusing element 581, in which an annular reflection layer centering on a rotation center is formed, and a rotating device 582 that rotates the light diffusing element 581. Note that the reflection layer causes lambert reflection of the incident light.

The excitation light (diffused light) diffused and reflected by the light diffusing element 581 is made incident on the second phase difference element 56 again via the first light condensing element 57. When being reflected by the light diffusing element 581, circularly polarized light made incident on the light diffusing element 581 changes to reversely circling circularly polarized light and is, in a process in which the circularly polarized light passes through the second phase difference element 56, converted into excitation light of s polarized light, a polarizing direction of which is rotated 90° with respect to excitation light of p polarized light that passes through the light combining device 55. The excitation light of the s polarized light is reflected by the polarization separation layer 555 and made incident on the equalizing device 7 as blue light along the second illumination optical axis Ax2.

Configuration of the Second Light Condensing Element

The excitation lights of the s polarized lights passed through the homogenizer optical device 54 and reflected on the polarization separation layer 555 are made incident on the second light condensing element 59. As explained above, the second light condensing element 59 condenses (converges) the incident lights in the illuminated region of the wavelength conversion device 6 (a wavelength conversion layer 612 of the wavelength conversion element 61). Besides, the second light condensing element 59 collimates the fluorescent light emitted from the wavelength conversion device 6 and emits the fluorescent light toward the polarization separation layer 555. In this embodiment, the second light condensing element 59 is configured by three pickup lenses 591 to 593. However, like the first light condensing element 57, the number of lenses included in the second light condensing element 59 is not limited to three.

Configuration of the Wavelength Conversion Device

The wavelength conversion device 6 converts a wavelength of light made incident on the wavelength conversion device 6. In this embodiment, the wavelength conversion device 6 converts excitation light of blue light (excitation light of s polarized light) made incident on the wavelength conversion device 6 into fluorescent light including green light and red light. The wavelength conversion device 6 includes the wavelength conversion element 61 and the rotary cooling device 62 that rotates and cools the wavelength conversion element 61.

The rotary cooling device 62 is explained in detail below.

The wavelength conversion element 61 includes a supporting body 611 and a wavelength conversion layer 612 and a reflection layer 613 located on an incident surface 611A of excitation light in the supporting body 611.

The supporting body 611 is a flat member formed in a substantially circular shape when viewed from an incident side of the excitation light. The supporting body 611 can be configured by, for example, metal or ceramics.

The wavelength conversion layer 612 is an illuminated region illuminated by the homogenizer optical device 54 and the second light condensing element 59. The wavelength conversion layer 612 is a phosphor layer including a phosphor that is excited by excitation light made incident on the wavelength conversion layer 612 and emits fluorescent light (e.g., fluorescent light having a peak wavelength in a wavelength region of 500 to 700 nm), which is non-polarized light. A part of the fluorescent light generated in the wavelength conversion layer 612 is emitted to the second light condensing element 59 side. Another part of the fluorescent light is emitted to the reflection layer 613 side.

The reflection layer 613 is disposed between the wavelength conversion layer 612 and the supporting body 611 and reflects the fluorescent light made incident from the wavelength conversion layer 612 to the second light condensing element 59 side.

When excitation light is irradiated on the wavelength conversion layer 612, the fluorescent light is diffused and emitted to the second light condensing element 59 side by the wavelength conversion layer 612 and the reflection layer 613. The fluorescent light is made incident on the polarization separation layer 555 via the second light condensing element 59, passes through the polarization separation layer 555 along the second illumination optical axis Ax2, and is made incident on the equalizing device 7. That is, the fluorescent light passes through the polarization separation layer 555 to thereby be made incident on the equalizing device 7 as the illumination light WL together with the excitation light, which is blue light, reflected on the polarization separation layer 555.

The wavelength conversion layer 612 generates heat with the incidence of the excitation light. The generated heat is transmitted to the supporting body 611 via the reflection layer 613. The heat transmitted to the supporting body 611 is radiated by a heat radiating body 64 of the rotary cooling device 62 connected to a surface 611B on the opposite side of the incident surface 611A in the supporting body 611.

Configuration of the Equalizing Device

The equalizing device 7 equalizes an illuminance distribution of illumination lights made incident on image forming regions (modulation regions), which are illuminated regions, of the light modulating devices 44 (44R, 44G, and 44B). The equalizing device 7 includes a first lens array 71, a second lens array 72, a polarization conversion element 73, and a superimposing lens 74 disposed such that optical axes thereof coincide with the second illumination optical axis Ax2.

The first lens array 71 includes a plurality of small lenses 711 arrayed in a matrix shape in a plane orthogonal to the second illumination optical axis Ax2 and divides illumination light made incident on the first lens array 71 into a plurality of partial light beams.

Like the first lens array 71, the second lens array 72 includes a plurality of small lenses 721 arrayed in a matrix shape in a plane orthogonal to the second illumination optical axis Ax2. The small lenses 721 are in a one-to-one relation with the small lenses 711 corresponding to the small lenses 721. The small lenses 721 superimposes the plurality of partial light beams divided by the small lenses 711 on the image forming regions of the light modulating devices 44 in conjunction with the superimposing lens 74. Consequently, the illuminance distribution of the illumination lights made incident on the image forming regions (the modulation regions) is equalized.

The polarization conversion element 73 is disposed between the second lens array 72 and the superimposing lens 74 and has a function of aligning polarization directions of the plurality of partial light beams.

Configuration of the Rotary Cooling Device

Figure 4:
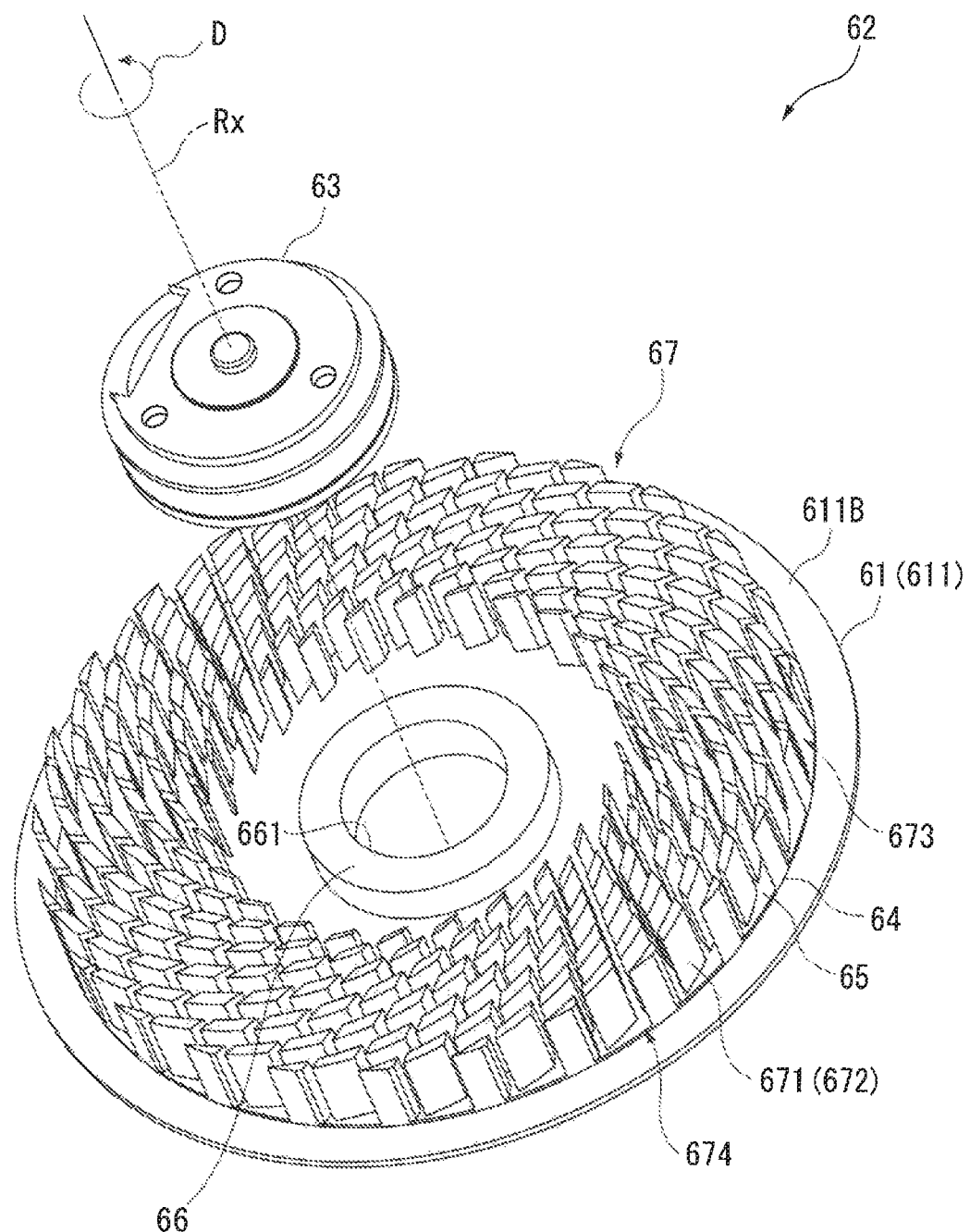
FIG. 4 is an exploded perspective view showing a rotary cooling device in the embodiment.

FIG. 4 is an exploded perspective view showing the rotary cooling device 62.

As explained above, the rotary cooling device 62 rotates the heat radiating body 64, to which the heat of the wavelength conversion element 61 set as the cooling target is transmitted, together with the wavelength conversion element 61 and cools the heat radiating body 64 and the wavelength conversion element 61. The rotary cooling device 62 includes, as shown in FIG. 4, a rotating device 63 and a heat radiating body 64 connected to the supporting body 611 of the wavelength conversion element 61 and rotated by the rotating device 63.

The rotating device 63 is configured by a motor and the like.

Figure 5:
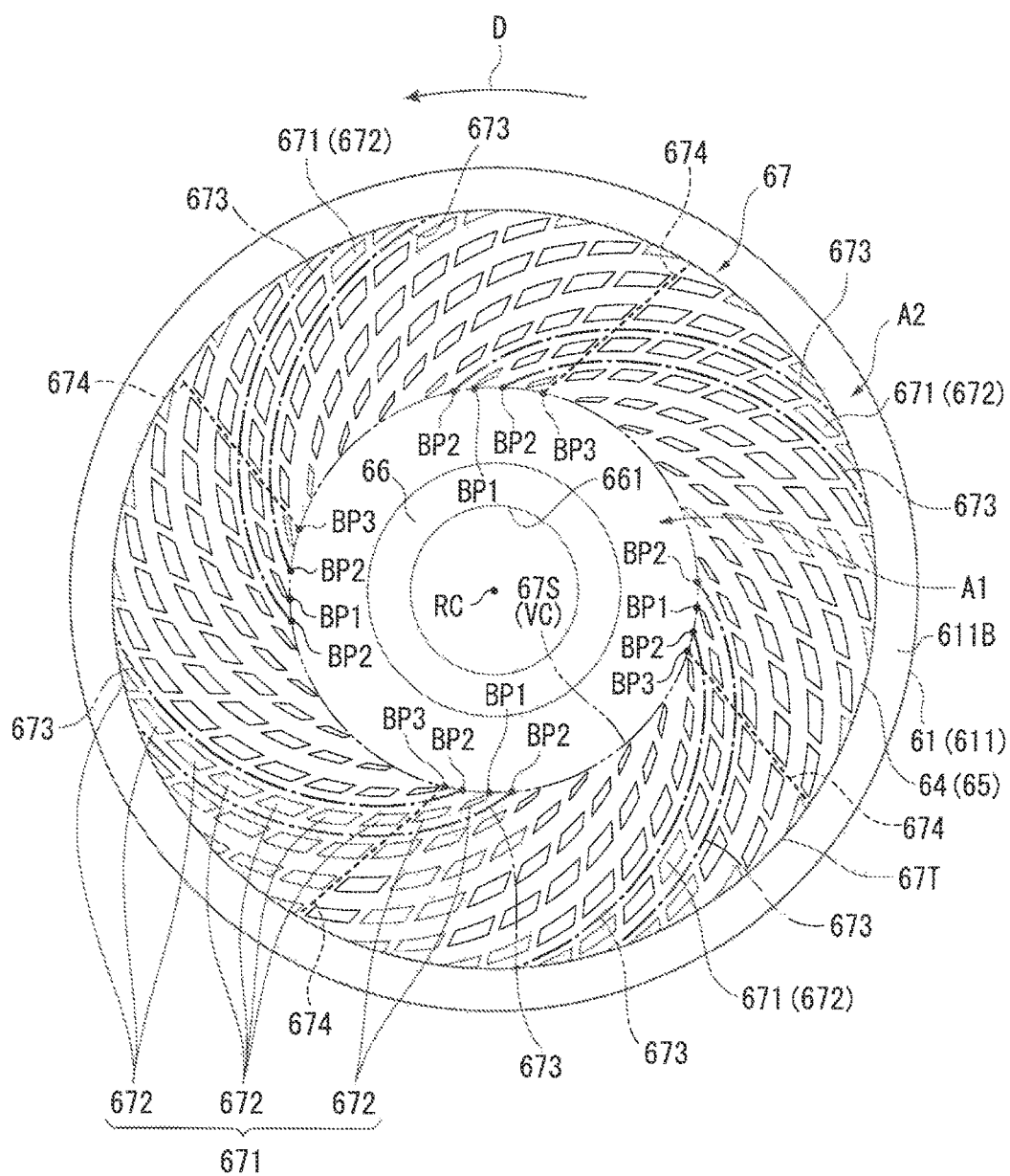
FIG. 5 is a diagram of a heat radiating body of the rotary cooling device viewed from the opposite side of a wavelength conversion element in the embodiment.

FIG. 5 is a diagram of the heat radiating body 64 of the rotary cooling device 62 viewed from the opposite side of the wavelength conversion element 61. Note that, in FIG. 5, concerning base points BP1 of fins 671, base points BP2 of first grooves 673, and base points BP3 of second grooves 674 explained below, only a part thereof are denoted by the reference signs taking into account viewability. In FIG. 5, apart of the first grooves 673 are indicated by alternate long and short dash lines and a part of the second grooves 674 are indicated by alternate long and two short dashes lines.

As shown in FIGS. 4 and 5, the heat radiating body 64 radiates heat of the wavelength conversion layer 612 transmitted from the supporting body 611. The heat radiating body 64 includes a base 65 connected to the surface 611B of the supporting body 611 and a connecting section 66 and a heat radiating section 67 provided in the base 65.

In this embodiment, the base 65 is a substrate formed in a substantially circular shape when viewed along a rotation axis of rotation of the heat radiating body 64 by the rotating device 63. The base 65 is formed of a material having high thermal conductivity. Examples of such a material include metal such as aluminum.

The connecting section 66 is located in the inner circumferential portion of the base 65 formed in the circular shape. The connecting section 66 is an annular boss in which a circular opening section 661 is formed in the center. A rotating section (not shown in the figure) of the rotating device 63 is fit in the opening section 661 to connect the rotating device 63 to the connecting section 66.

The heat radiating section 67 is formed integrally with the base 65 and radiates heat conducted from the base 65. The heat radiating section 67 is formed in an annular shape centering on a rotation center RC of the base 65 and is located on the outer side of the connecting section 66.

The heat radiating section 67 includes a plurality of fins 671 and a plurality of first grooves 673 and a plurality of second grooves 674 that respectively divide the plurality of fins 671. In other words, the heat radiating section 67 includes the plurality of first grooves 673 and the plurality of second grooves 674 and the plurality of fins 671 configured by the plurality of fin elements 672 divided by the first grooves 673 and the second grooves 674.

Explanation of the Heat Radiating Section Focusing on the Fins

The heat radiating section 67 is explained focusing on the fins 671.

The plurality of fins 671 stand from the surface on the opposite side of the supporting body 611 in the base 65 and extend from positions on the rotation center RC side in the heat radiating section 67 to the outer circumference side of the heat radiating section 67 (the base 65). The plurality of fins 671 are arrayed at substantially equal intervals along a D direction, which is a rotating direction of the base 65. The first grooves 673 are respectively formed among the fins 671.

Specifically, the fins 671 extend from the base points BP1, which are set at substantially equal intervals on an imaginary circle VC centering on the rotation center RC and having a diameter smaller than the diameter of the heat radiating section 67, toward an outer end edge 67T of the heat radiating section 67. The fins 671 are formed in arcuate shapes having a predetermined curvature to further warp in the opposite direction of the D direction from the base points BP1 toward the outer end edge 67T.

Note that the imaginary circle VC is an imaginary circle substantially coinciding with an inner end edge 67S of the heat radiating section 67 formed in an annular shape.

The plurality of first grooves 673 formed among the fins 671 are also formed in arcuate shapes having the same curvature as the curvature of the fins 671 from the base points BP2 set at substantially equal interval on the imaginary circle VC toward the outer end edge 67T of the heat radiating section 67. That is, the first grooves 673 are formed at substantially equal intervals along the rotating direction of the base 65. When viewed along a rotation axis Rx (see FIG. 4) of the base 65, the first grooves 673 cause an inner region A1, which is a region further on the inner side (the rotation center RC side) than the inner end edge 67S of the heat radiating section 67, and an outer region A2, which is a region further on the outer side than the outer end edge 67T of the heat radiating section 67, to communicate with each other. That is, the first grooves 673 communicate with the outer region A2.

Note that, in this embodiment, the fins 671 are formed such that a thickness dimension (a dimension in a direction crossing the extending direction of the fins 671) gradually increases from the base points BP1 toward the outer end edge 67T. For this reason, a groove width (a dimension in a direction crossing the extending direction of the first grooves 673) of the first grooves 673 is fixed from the base points BP2 toward the outer end edge 67T. However, not only this but the groove width of the first grooves 673 may change from the base points BP2 toward the outer end edge 67T and, for example, may increase toward the outer end edge 67T.

The plurality of second grooves 674 extend from the base points BP3 set on the inner circumference side in the base 65 to the outer circumference side of the heat radiating section 67 (the base 65). Specifically, the second grooves 674 linearly extend from the base points BP3 set at substantially equal intervals on the imaginary circle VC toward the outer end edge 67T. In this way, the first grooves 673 and the second grooves 674 are formed rotation-symmetrically around the rotation center RC.

The second grooves 674 cause the inner region A1 and the outer region A2 to communicate with each other. That is, the second grooves 674 communicate with the outer region A2.

The second grooves 674 cross at least any one of the plurality of first grooves 673 and cross at least any one of the plurality of fins 671. For this reason, the plurality of fins 671 are divided into the plurality of fin elements 672 by the plurality of second grooves 674 crossing the plurality of fins 671.

Note that a groove width of the second grooves 674 is smaller than the groove width of the first grooves 673 and is fixed from the base points BP3 toward the outer end edge 67T in a range in which the groove width is smaller than a maximum thickness dimension of the fins 671 (the fin elements 672). However, not only this, but the groove width of the second grooves 674 may change toward the outer end edge 67T. For example, the groove width may increase toward the outer end edge 67T. The base points BP3 set on the imaginary circle VC may coincide with the base points BP2 or may be different from the base points BP2.

Explanation of the Heat Radiating Section Focusing on the First Grooves and the Second Grooves The heat radiating section 67 is explained focusing on the first grooves 673 and the second grooves 674.

As shown in FIG. 5, the plurality of first grooves 673 and the plurality of second grooves 674 extend from positions on the rotation center RC side in the heat radiating section 67 toward the outer circumference side of the base 65. The second grooves 674 cross at least any one of the plurality of first grooves 673.

Specifically, the plurality of first grooves 673 are formed from the base points BP2, which are set at substantially equal intervals on the imaginary circle VC corresponding to the inner end edge 67S of the heat radiating section 67 toward the outer end edge 67T of the heat radiating section 67. The first grooves 673 are formed in arcuate shapes having the same curvature to further warp in the opposite direction of the D direction from the base points BP2 toward the outer end edge 67T. The plurality of second grooves 674 linearly extend from the base points BP3 set at substantially equal intervals on the imaginary circle VC toward the outer end edge 67T.

In this way, the first grooves 673 and the second grooves 674 are formed rotation-symmetrically around the rotation center RC.

The first grooves 673 and the second grooves 674 cause the inner region A1 and the outer region A2 to communicate with each other. That is, the first grooves 673 and the second grooves 674 communicate with the outer region A2.

Note that, as explained above, the groove widths of the first grooves 673 and the second grooves 674 are fixed from the base points BP2 toward the outer end edge 67T. The groove width of the second grooves 674 is smaller than the groove width of the first grooves 673. However, not only this, but, as explained above, the grove width of each of the first grooves 673 and the second grooves 674 may change toward the outer end edge 67T.

The plurality of first grooves 673 and the plurality of second grooves 674 are formed in the heat radiating section 67 in this way, whereby the plurality of fin elements 672 divided by the first grooves 673 and the second grooves 674 are formed in the heat radiating section 67. Among the fin elements 672, the plurality of fin elements 672 formed between two first grooves 673 adjacent to each other along the D direction can be grasped as the fin elements 672 configuring one fin 671 extending from the base points BP1 set on the imaginary circle VC toward the outer end edge 67T. The base points BP1 of the fins 671 are set at substantially equal intervals on the imaginary circle VC. The plurality of fins 671 are formed at equal intervals along the D direction.

Flow of the Cooling Gas Circulated in the Heat Radiating Section

Figure 6:
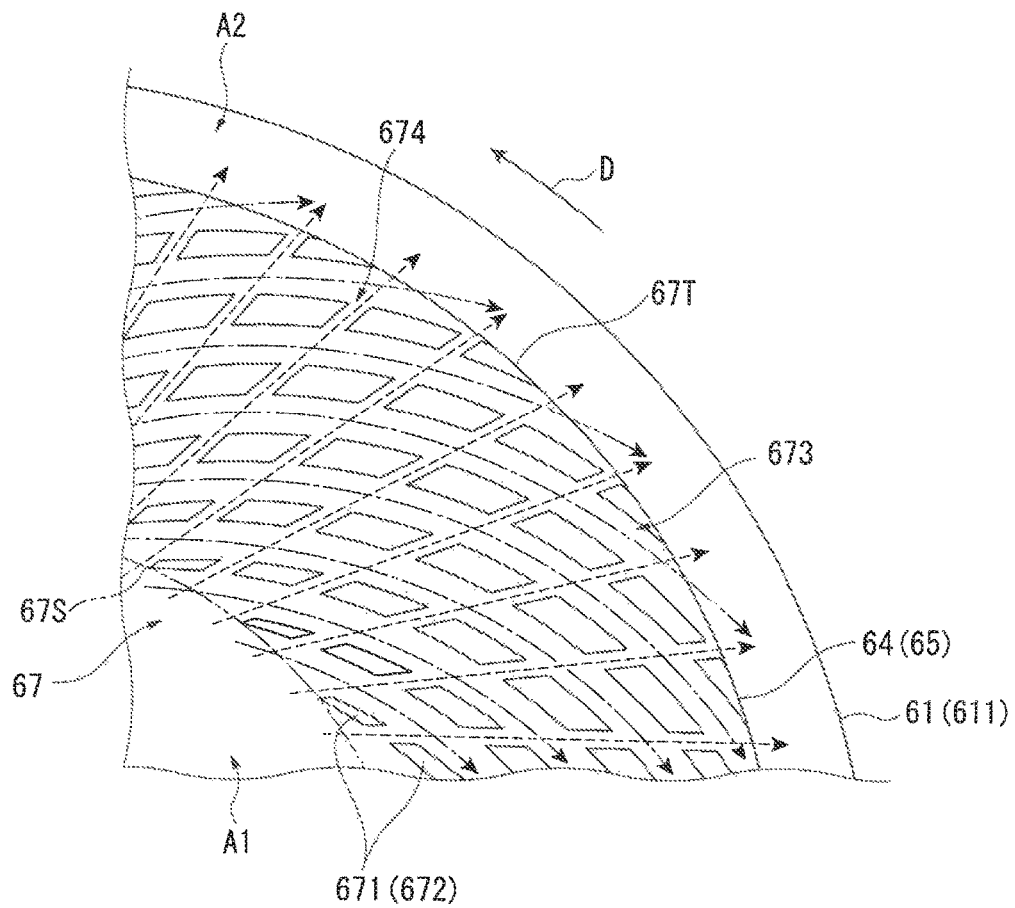
FIG. 6 is a schematic diagram showing a flow of a cooling gas that circulates in a heat radiating section.

FIG. 6 is a partially enlarged view of the heat radiating section 67 and is a diagram showing a flow of the cooling gas circulating in the heat radiating section 67. Note that, in FIG. 6, a circulating direction of the cooling gas circulating in the first grooves 673 is indicated by arrows of alternate long and short dash lines. A circulating direction of the cooling gas circulating in the second grooves 674 is indicated by arrows of dotted lines.

When the heat radiating body 64 (the base 65) is rotated by the rotating device 63 together with the wavelength conversion element 61 (the supporting body 611), as shown in FIG. 6, the cooling gas for cooling the heat radiating section 67 circulates from the inner region A1 side to the outer region A2 side along the first grooves 673 and the second grooves 674.

At this point, since the groove width of the first grooves 673 is larger than the groove width of the second grooves 674, the cooling gas circulates using the first grooves 673 as a main channel. In crossing parts of the first grooves 673 and the second grooves 674, a part of the cooling gas flows into the second grooves 674 with a centrifugal force involved in the rotation of the heat radiating body 64 (the base 65) and merges with the cooling gas circulating in the other first grooves 673 adjacent to the first grooves 673 on the D direction side.

Detailed Configuration of the Fin Elements

Figure 7:
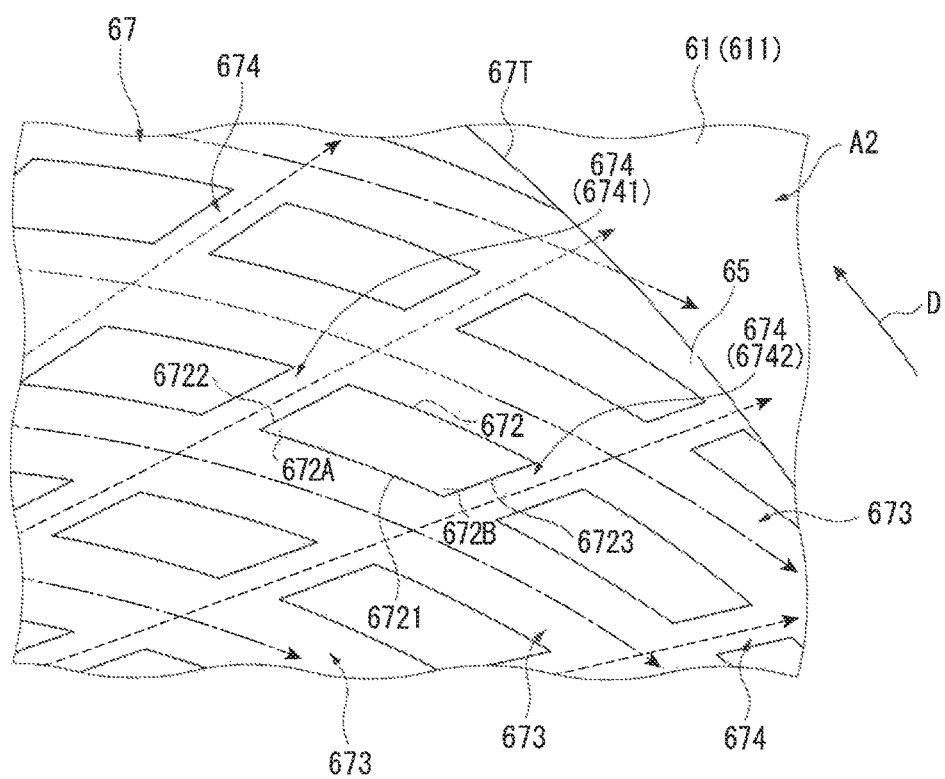
FIG. 7 is an enlarged view of fin elements in the embodiment.

FIG. 7 is an enlarged view of the fin elements 672.

In each of the fin elements 672 divided by the first grooves 673 and the second grooves 674, as shown in FIG. 7, an end portion 672A on the rotation center RC side and on the base point BP1 side (the inner circumference side) among end portions in the fin element 672 is formed to be a corner portion of an acute angle. In other words, in each of the fin elements 672, the end portion 672A located on the rotation center RC side and an upstream side in a channel of the cooling gas circulating in the first grooves 673 is formed such that an end edge 6721 forming the first groove 673 and an end edge 6722 forming the second groove 674 (6741) crossing the first groove 673 cross at an acute angle. For this reason, a part of the cooling gas circulating in the first groove 673 collides with the end portion 672A and cools the end portion 672A. The part of the cooling gas is divided by the end portion 672A into a cooling gas circulating in the first groove 673 along the end edge 6721 and a cooling gas circulating in the second groove 674 (6741) along the end edge 6722. Consequently, the entire fin element 672 is cooled.

Further, in each of the fin elements 672, an end portion 672B on the rotation center RC side and the outer end edge 67T side is formed to be a corner portion of an obtuse angle. In other words, in each of the fin elements 672, the end portion 672B located on the rotation center RC side and on a downstream side in the channel of the cooling gas circulating in the first groove 673 is formed such that the end edge 6721 forming the first groove 673 and an end edge 6723 forming the second groove 674 (6742) located on the opposite direction side of the D direction with respect to the second groove 6741 among the second grooves 674 crossing the first groove 673 cross at an obtuse angle. For this reason, a part of the cooling gas colliding with the end portion 672A of the fin element 672 located on the downstream side in the channel of the cooling gas circulating in the first groove 673 with respect to the fin element 672, in which the end portion 672B is formed as the corner portion of the obtuse angle, easily flows into the second grove 674 sandwiched by the fin elements 672.

The cooling gas circulates along the first grooves 673 and the second grooves 674 in this way, whereby the fins 671 (the fin elements 672) are cooled and heat of the fins 671, that is, heat of the wavelength conversion element 61 is transmitted to the cooling gas. The cooling gas, which absorbs heat from the heat radiating section 67, is discharged to the outer region A2 from the outer end edge 67T of the heat radiating section 67.

Effects in the Embodiment

With the projector 1 according to this embodiment explained above, there are effects explained below.

In the heat radiating section 67, the plurality of fins 671 extend from the base points BP1 set on the rotation center RC side toward the outer end edge 67T. The fins 671 are divided into the plurality of fin elements 672 by the plurality of second grooves 674 crossing at least any one of the plurality of first grooves 673 formed among the fins 671. In other words, the heat radiating section 67 includes the plurality of first grooves 673 extending from the base points BP2 set on the rotation center RC side toward the outer end edge 67T, the plurality of second grooves 674 crossing at least any one of the plurality of first grooves 673, and the plurality of fin elements 672 divided by the plurality of first grooves 673 and the plurality of second grooves 674.

Consequently, when the heat radiating body 64 (the base 65) is rotated by the rotating device 63, in a process in which the cooling gas circulates along the first grooves 673 and is discharged to the outer region A2, a part of the cooling gas circulates along the second groove 674 crossing the first groove 673. For this reason, compared with when the second grooves 674 are absent, it is possible to make it easy to increase a contact area of the fins 671 (the fin elements 672) and the cooling gas.

Besides, since the fin elements 672 are divided by the second grooves 674 extending along the thickness direction (the direction along the D direction) of the fin elements 672, the cooling gas circulating in the second grooves 674 circulates along the thickness direction. Consequently, it is possible to prevent heat from accumulating in the fins 671 (the fin elements 672).

Therefore, it is possible improve cooling efficiency of the heat radiating section 67 to which heat of the wavelength conversion element 61 (the wavelength conversion layer 612), which is the cooling target, is transmitted. Further, it is possible to improve cooling efficiency of the wavelength conversion element 61 (the wavelength conversion layer 612).

Consequently, it is possible to prevent heat saturation from occurring in the wavelength conversion layer 612. It is possible to configure the wavelength conversion device 6 capable of stably emitting light. Besides, it is possible to achieve an extension of the life of the wavelength conversion device 6 (the wavelength conversion element 61) and an extension of the life of the light source device 5.

The plurality of fins 671 are disposed at substantially equal intervals along the D direction. The fins 671 have the shape further warping in the opposite direction of the D direction from the rotation center RC side toward the outer end edge 67T. Consequently, the first grooves 673 that are formed among the fins 671 and in which the cooling gas circulates can be disposed at the substantially equal intervals. For this reason, it is possible to prevent deviation from occurring in a cooling state in the heat radiating section 67 by the cooling gas.

Further, since the fins 671 have the shape explained above, the fin elements 672 less easily cross the D direction at right angles. Therefore, it is possible to reduce wind noise caused by collision of the fin elements 672 and the cooling gas. Besides, since it is possible to reduce rotational resistance of the heat radiating body 64, it is possible to reduce a load on the rotating device 63.

The plurality of second grooves 674 extend from the base points BP3 toward the outer end edge 67T and communicate with the outer region A2 located further on the outer side than the outer end edge 67T. Consequently, when the heat radiating body 64 (the base 65) is rotated, it is possible to make it easy to circulate the cooling gas, which circulates from the inner region A1 to the outer region A2, along the second grooves 674. Besides, it is possible to make it easy to discharge the cooling gas, which absorbs heat from the fin elements 672, to the outer region A2. Therefore, it is possible to prevent the cooling gas, which absorbs heat from the heat radiating section 67, from being held up in the heat radiating section 67. Therefore, it is possible to improve cooling efficiency of the heat radiating section 67 and the wavelength conversion element 61.

The plurality of fins 671, the plurality of first grooves 673, and the plurality of second grooves 674 are formed rotation-symmetrically around the rotation center RC. Consequently, it is possible to regularly circulate the cooling gas for cooling the heat radiating section 67 along the first grooves 673 and the second grooves 674. Therefore, it is possible to prevent deviation from occurring in a cooling state of the heat radiating section 67. Besides, it is possible to prevent the center of gravity of the heat radiating body 64 from the rotation center RC. Therefore, it is possible to smoothly rotate the heat radiating body 64. It is possible to reduce a load on the rotating device 63.

The groove width of the plurality of first grooves 673 is larger than the groove width of the plurality of second grooves 674. Consequently, when the base 65 is rotated, the cooling gas circulates using, as the main channel, the first grooves 673 communicating with the outer region A2. For this reason, it is possible to surely discharge the cooling gas, which cools the fin elements 672, to the outer region A2. Therefore, it is possible to surely prevent the cooling gas, which absorbs heat from the heat radiating section 67, from being held up in the heat radiating section 67. Therefore, it is possible to improve cooling efficiency of the heat radiating section 67 and the wavelength conversion element 61.

In each of the plurality of fin elements 672, the end portion 672A is formed as the corner portion of the acute angle. Consequently, it is possible to make it easy to cause the cooling gas to collide with the end portion 672A. Besides, it is possible to make it easy to divert the cooling gas to the first groove 673 and the second groove 674. For this reason, since it is possible to make it easy to circulate the cooling gas along not only the end portion 672A but also the entire fin element 672, it is possible to improve heat exchange efficiency between the fin element 672 and the cooling gas. Therefore, it is possible to improve cooling efficiency of the fin elements 672. It is possible to improve cooling efficiency of the wavelength conversion element 61.

Modifications of the Embodiment

The invention is not limited to the embodiment. Modifications, improvements, and the like in a range in which the object of the invention can be achieved are included in the invention. Note that, in the following explanation, the same or substantially same portions as the portions explained above are denoted by the same reference numerals and signs and explanation of the portions is omitted.

First Modification of the Heat Radiating Section

Figure 8:
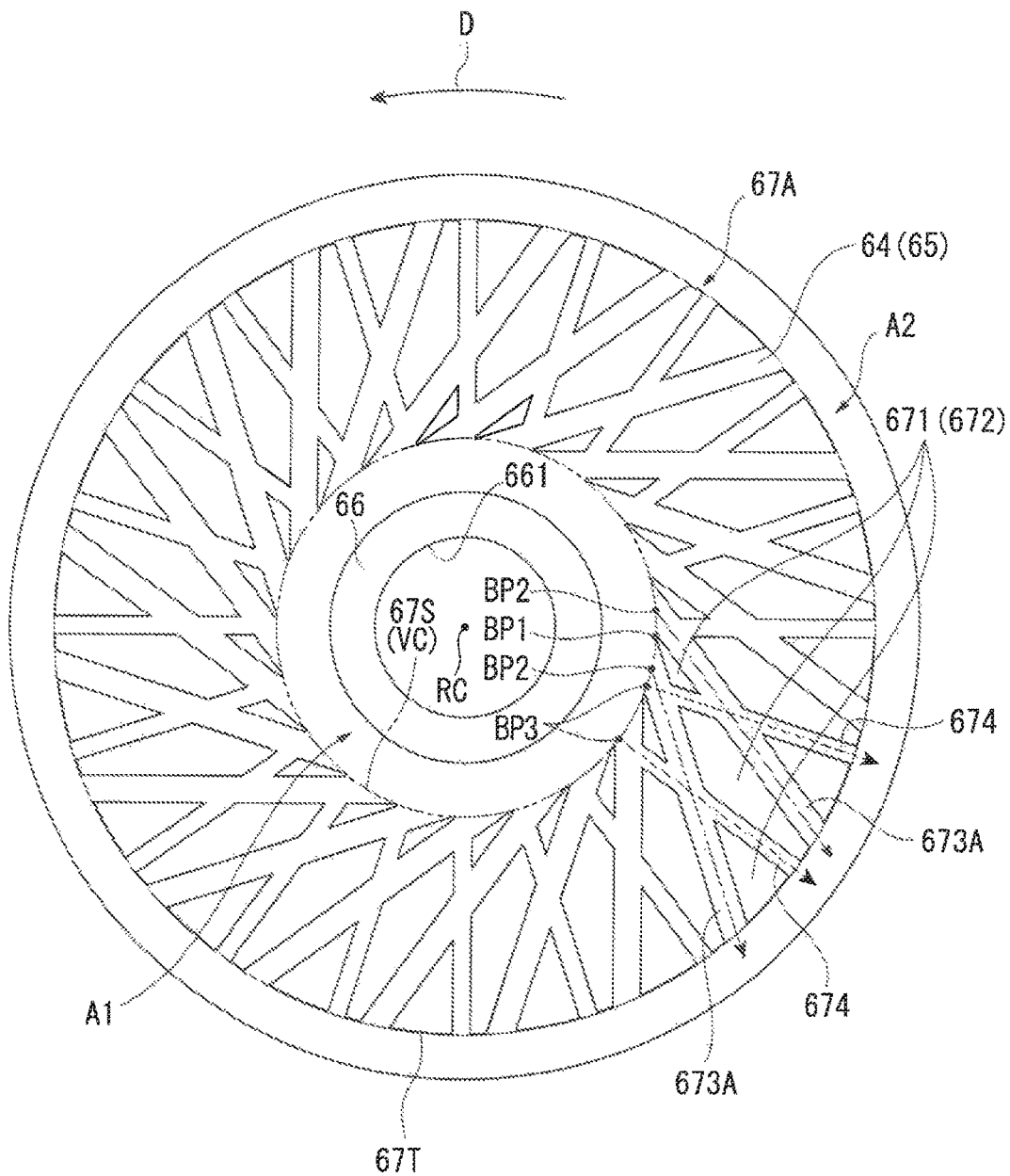
FIG. 8 is a diagram of a heat radiating section, which is a first modification of the heat radiating section in the embodiment, viewed from the opposite side of the wavelength conversion element.

FIG. 8 is a diagram of a heat radiating section 67A, which is a first modification of the heat radiating section 67, viewed from the opposite side of the wavelength conversion element 61. Note that, in FIG. 8, concerning the fins 671, first grooves 673A and second grooves 674, and the base points BP1 to BP3 of the fins and the grooves, only a part thereof are denoted by the reference numerals and signs taking into account viewability. In FIG. 8, a flow of the cooling gas circulating along one of a plurality of first grooves 673A is indicated by an alternate long and short dash line. A flow of the cooling gas circulating along one of the plurality of second grooves 674 is indicated by a dotted line.

In the heat radiating section 67, the first grooves 673 extend in the arcuate shapes (curve shapes) having the same curvature to further warp in the opposite direction of the D direction from the base points BP 2 toward the outer end edge 67T. However, not only this, but the first grooves may linearly extend. For example, the heat radiating section 67A shown in FIG. 8 may be adopted instead of the heat radiating section 67.

Like the heat radiating section 67, the heat radiating section 67A includes the plurality of fins 671, the plurality of first grooves 673A formed among the plurality of fins 671, the plurality of second grooves 674 that cross at least any one of the plurality of first grooves 673A and divide the fins 671 into the plurality of fin elements 672. In other words, the heat radiating section 67A includes the plurality of first grooves 673A and the plurality of second grooves 674 and the plurality of fins 671 configured by the plurality of fin elements 672 divided by the first grooves 673A and the second grooves 674. The plurality of fins 671, the plurality of first grooves 673A, and the plurality of second grooves 674 are formed rotation-symmetrical around the rotation center RC in the heat radiating section 67A.

The plurality of first grooves 673A linearly extend in directions, crossing angles of which with respect to the diameter direction of the base 65 are the same, from the base points BP2 set at substantially equal intervals on the imaginary circle VC toward the outer end edge 67T of the heat radiating section 67A. The first groves 673A cause the inner region A1 and the outer region A2 to communicate with each other. That is, the first grooves 673A communicate with the outer region A2.

Note that, in the heat radiating section 67A, as in the heat radiating section 67, a groove width of the first grooves 673A and a groove width of the second grooves 674 are substantially fixed from the base points BP2 and BP3 toward the outer end edge 67T. The groove width of the first grooves 673A is larger than the groove width of the second grooves 674. However, not only this, but the groove widths of the first grooves 673A and the second grooves 674 do not have to be fixed. The groove width of the first grooves 673A may be smaller than or the same as the groove width of the second grooves 674.

The end portion 672A in the fin element 672 divided by the first groove 673A and the second groove 674 is a corner portion of an acute angle as in the heat radiating section 67. The end portion 672B is a corner portion of an obtuse angle as in the heat radiating section 67.

When a heat radiating body including the heat radiating section 67A is adopted in the projector 1 instead of the heat radiating body 64, it is possible to achieve the same effects as the effects of the projector 1 including the rotary cooling device 62.

Second Modification of the Heat Radiating Section

Figure 9:
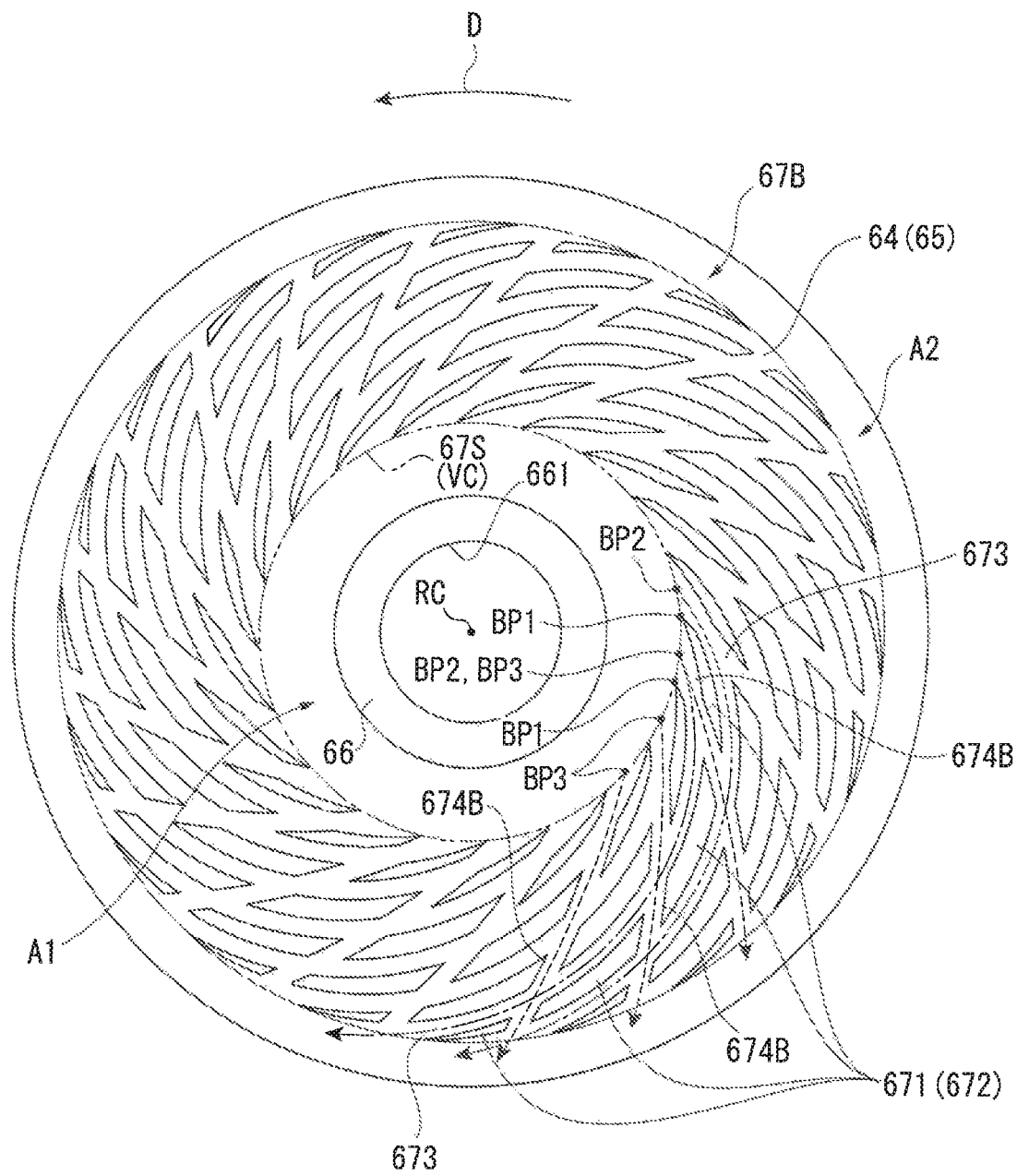
FIG. 9 is a diagram of a heat radiating section, which is a second modification of the heat radiating section in the embodiment, viewed from the opposite side of the wavelength conversion element.

FIG. 9 is a diagram of a heat radiating section 67B, which is a second modification of the heat radiating section 67, viewed from the opposite side of the wavelength conversion element 61. Note that, in FIG. 9, concerning the fins 671, the first grooves 673 and second grooves 674B, and the base points BP1 to BP3 of the fins and the grooves, only a part thereof are denoted by the reference numerals and signs taking into account viewability. In FIG. 9, a flow of a cooling gas circulating along one of the plurality of first grooves 673 is indicated by an alternate long and short dash line. A flow of the cooling gas circulating along one of a plurality of second grooves 674B is indicated by a dotted line.

In the heat radiating sections 67 and 67A, the plurality of second grooves 674 linearly extend from the base points BP3 toward the outer end edge 67T. However, not only this, but the plurality of second grooves may extend in a curve shape. For example, the heat radiating section 67B shown in FIG. 9 may be adopted instead of the heat radiating section 67.

Like the heat radiating section 67, the heat radiating section 67B includes the plurality of fins 671, the plurality of first grooves 673 formed among the plurality of fins 671, the plurality of second grooves 674B that cross at least any one of the plurality of first grooves 673 and divide the fins 671 into the plurality of fin elements 672. In other words, the heat radiating section 67B includes the plurality of first grooves 673 and the plurality of second grooves 674B and the plurality of fins 671 configured by the plurality of fin elements 672 divided by the first grooves 673 and the second grooves 674B. The plurality of fins 671, the plurality of first grooves 673, and the plurality of second grooves 674B are formed rotation-symmetrical around the rotation center RC in the heat radiating section 67B.

Like the plurality of second grooves 674, the plurality of second grooves 674B extend from the base points BP3 set at substantially equal intervals on the imaginary circle VC toward the outer circumference of the heat radiating section 67B and cause the inner region A1 and the outer region A2 to communicate with each other. That is, the second grooves 674B communicate with the outer region A2.

The second grooves 674B are formed in arcuate shapes having a predetermined curvature to further warp in the opposite direction of the D direction from the base points BP3 toward the outer end edge 67T. As explained above, the second grooves 674B cross at least any one of the plurality of first grooves 673. In this embodiment, the curvature is set to a curvature different from the curvature of the first grooves 673. The curvature center of the second grooves 674B is not shown in the figure. However, the second grooves 674B are set at substantially equal intervals on an imaginary circle centering on the rotation center RC and having a radius larger than the radius of the imaginary circle VC.

In the heat radiating section 67B, as in the heat radiating sections 67 and 67A, a groove width of the first grooves 673 and a groove width of the second grooves 674B are fixed from the base points BP2 and BP3 toward the outer end edge 67T. The groove width of the first grooves 673 is larger than the groove width of the second grooves 674B. On the other hand, the groove width of the second grooves 674B is smaller than a maximum thickness dimension of the fin elements 672. However, not only this, but the groove widths of the first grooves 673 and the second grooves 674B do not have to be fixed. The groove width of the first grooves 673 may be smaller than or the same as the groove width of the second groove 674B.

Note that, although not shown in the figure, the end portion 672A in the fin element 672 divided by the first groove 673 and the second groove 674B is a corner portion of an acute angle as in the heat radiating section 67. The end portion 672B is a corner portion of an obtuse angle as in the heat radiating section 67.

When a heat radiating body including the heat radiating section 67B is adopted in the projector 1 instead of the heat radiating body 64, it is possible to achieve the same effects as the effects of the projector 1 including the rotary cooling device 62.

Other Modifications

In the rotary cooling device 62, the plurality of fins 671, the pluralities of first grooves 673 and 673A, and the pluralities of second grooves 674 and 674B are formed at the substantially equal intervals along the rotating direction of the heat radiating body 64 (the base 65) (the D direction). However, not only this, but the plurality of fins and the plurality of first grooves and the plurality of second grooves do not have to be formed at the substantially equal intervals along the rotating direction and do not have to be rotation-symmetrical.

In the rotary cooling device 62, the pluralities of second grooves 674 and 674B extend from the base points BP3, which are set on the imaginary circle VC coinciding with the inner end edge 67S, to the outer end edge 67T to cause the inner region A1 and the outer region A2 to communicate with each other. However, not only this, but the plurality of second grooves do not have to be formed to pierce through the heat radiating section from the inner end edge to the outer end edge of the heat radiating section as long as the plurality of second grooves cross at least any one of the plurality of first grooves and divide the fins 671 into the plurality of fin elements 672. That is, the second grooves do not have to cause the inner region and the outer region of the heat radiating section to communicate with each other.

The plurality of second grooves do not have to extend a position on the rotation center side in the heat radiating section toward the outer circumference side. For example, the second grooves may be formed in parallel to a straight line (a straight line in the radial direction) connecting the rotation center of the heat radiating body 64 (the base 65) and one point on the outer end edge of the heat radiating section. Further, the base points of the plurality of first grooves and the base points of the plurality of second grooves do not have to be set on the imaginary circle VC and may be set in the rotation center of the heat radiating body 64 (the base 65).

In the rotary cooling device 62, the plurality of first grooves 673 are formed in the arcuate shape further warping in the opposite direction of the rotating direction of the heat radiating body 64 (the base 65) from the base points BP2 toward the outer end edge 67T. That is, in the heat radiating sections 67 and 67B, the plurality of first grooves 673 are formed in the spiral shape centering on the rotation center RC. In the heat radiating section 67A, the plurality of first grooves 673A linearly extend from the base points BP2 toward the outer end edge 67T. However, not only this, but the shape of the first grooves may be changed as appropriate.

In the rotary cooling device 62, the heat radiating sections 67, 67A, and 67B are formed in the annular shape centering on the rotation center RC. However, not only this, but the inner region A1 may be absent. The heat radiating section may be formed in a circular shape or a polygonal shape when viewed along the rotation axis Rx of the heat radiating body 64 (the base 65). In this case, as in the embodiment, the cooling gas is introduced into the first grooves and the second grooves according to the rotation of the base in which the heat generating section is provided. The cooling gas is discharged to the outer region A2, which communicates with the first grooves and the second grooves, with a centrifugal force involved in the rotation of the base.

In the rotary cooling device 62, the groove width of the first grooves 673 and 673A is larger than the groove width of the second grooves 674 and 674B. However, not only this, but the groove width of the first grooves and the groove width of the second grooves may be the same. Note that, of the first grooves and the second grooves, the grooves having a larger groove width are considered to be grooves that mainly form the fins in the heat radiating section and function as the main channel in which the cooling gas flows.

In the rotary cooling device 62, in the plurality of fin elements 672, the end portion 672A on the rotation center RC side and on the inner circumference side of the heat radiating sections 67, 67A, and 67B is formed as the corner portion of the acute angle where the end edge 6721 forming the first groove 673 and the end edge 6722 forming the second groove 674 cross at the acute angle. In other words, in the fin elements 672 divided by the two first grooves adjacent to each other in the rotating direction of the heat radiating body 64 (the base 65) and the two second grooves adjacent to each other in the rotating direction, the end portion along the first groove on the rotation center RC side of the two first grooves and on the upstream side in the channel of the cooling gas circulating in the first groove is the corner portion where the end edge forming the first groove and the end edge forming the second groove on the rotating direction side of the base of the two second grooves cross at the acute angle. However, not only this, but the end portion does not have to be the corner portion of the acute angle. Note that, if the end portion is the corner portion of the acute angle, it is possible to achieve the effects explained above.

The rotary cooling device 62 configures the wavelength conversion device 6. That is, the base 65 of the rotary cooling device 62 is connected to the supporting body 611 of the wavelength conversion element 61 serving as the cooling target to be capable of transmitting heat. However, not only this, but the base 65 may be connected to another cooling target. Examples of the other cooling target include the light diffusing element 581 configuring the light diffusing device 58. That is, the rotary cooling device 62 may be adopted instead of the rotating device 582.

The rotary cooling device 62 is connected to the reflection-type wavelength conversion element 61 that emits the fluorescent light in the opposite direction of the incident direction of the excitation light. However, not only this, but the rotary cooling device 62 may be connected to a transmission-type wavelength conversion element. In this case, for example, the heat radiating section may be provided avoiding an incident region of the excitation light or an emission region of the florescent light. The fins may be provided avoiding the incident region or the emission region. When the rotary cooling device 62 is connected to the light diffusing element 581, if the light diffusing element 581 includes a diffusing transmission layer instead of the reflection layer, the heat radiating section and the fins may be provided avoiding the diffusing transmission layer.

In the rotary cooling device 62, in the supporting body 611, the base 65 is connected to the surface 611B on the opposite side of the incident surface 611A on which the wavelength conversion layer 612 and the reflection layer 613 are located. However, not only this, but the base 65 may also function as the supporting body 611. That is, the wavelength conversion layer may be located on the surface on the opposite side of the surface on which the heat radiating sections 67, 67A, and 67B are located in the base 65. The same applies when the wavelength conversion device is configured as a transmission-type wavelength conversion device. When the rotary cooling device 62 is adopted in the light diffusing device, the light diffusing layer may be located on the surface on the opposite side of the surface on which the heat radiating sections 67, 67A, and 67B are located in the base 65. The same applies when the light diffusing device is configured as a transmission-type light diffusing device.

The image projection device 4 has the configuration shown in FIG. 2. The illuminating device 41 and the light source device 5 have the configuration and the disposition shown in FIG. 3. However, not only this, but the configurations and the dispositions of the image projection device, the illuminating device, and the light source device may be changed as appropriate. For example, the light source device 5 does not have to be configured to diffuse and reflect, with the light diffusing device 58, a part of the excitation lights emitted from the light source section 51, make the other part of the excitation lights to incident on the wavelength conversion device 6 to generate fluorescent light, and thereafter combine and emit the excitation lights and the fluorescent light. Specifically, the light source device may include the wavelength conversion device 6 that emits lights including blue light and fluorescent light. In this case, a configuration can be illustrated in which a wavelength conversion layer and a light diffusing layer formed in concentric shapes centering on the rotation center of the supporting body 611 and respectively having different diameters are formed on the incident surface 611A of the supporting body 611.

The light source device may include, separately from the light source section 51, a light source section that emits blue light combined with the fluorescent light generated by the wavelength conversion device. Further, the light emitted by the light source device does not have to be white light.

The projector 1 includes the three light modulating devices 44 (44R, 44G, and 44B) respectively including the liquid crystal panels. However, not only this, but the invention may be applied to a projector including two or less or four or more light modulating devices.

The projector 1 includes the light modulating device 44 including the transmission-type liquid crystal panel, the light incident surface and the light emission surface of which are different. However, not only this, but a light modulating device including a reflection-type liquid crystal panel, a light incident surface and a light emission surface of which are the same, may be adopted. A light modulating device other than liquid crystal such as a light modulating device that makes use of a device including a micromirror, for example, a DVD (Digital Micromirrror Device) may be adopted as long as the light modulating device is capable of modulating an incident light beam and forming an image corresponding to image information.

In the embodiment, the example is explained in which the light source device 5 is applied to the projector 1. However, not only this, but the light source device 5 may be adopted in an electronic apparatus such as an illumination apparatus. The wavelength conversion device and the light diffusing device according to the invention may be applied to devices other than the light source device and the projector. The rotary cooling device according to the invention is also applicable to various cooling target.

The entire disclosure of Japanese Patent Application No. 2016-192985, filed Sep. 30, 2016 is expressly incorporated by reference herein.

What is claimed is:

1. A rotary cooling device comprising:
a rotating device;
a base connected to a cooling target and configured to be rotated by the rotating device; and
a heat radiating section disposed in the base and configured to radiate heat transmitted from the cooling target via the base, wherein
the heat radiating section includes:
 a plurality of fins extending from a rotation center side of the base to an outer circumference side of the base and arrayed along a rotating direction of the base;
 a plurality of first grooves formed among the plurality of fins and communicating with an outer region of the heat radiating section when viewed along a rotation axis of the base; and
 a plurality of second grooves crossing at least one of the plurality of first grooves to divide the plurality of fins into a plurality of fin elements, the plurality of second grooves linearly extending from the rotation center side to the outer circumference side of the base and communicating with the outer region.

2. The rotary cooling device according to claim 1, wherein the plurality of fins are disposed at substantially equal intervals along the rotating direction and have a shape further warping in an opposite direction of the rotating direction from the rotation center side toward the outer circumference side of the base.

3. The rotary cooling device according to claim 1, wherein the plurality of first grooves and the plurality of second grooves are formed rotation-symmetrically around the rotation center.

4. The rotary cooling device according to claim 1, wherein a groove width of the plurality of first grooves is larger than a groove width of the plurality of second grooves.

5. The rotary cooling device according to claim 1,
wherein an end portion on the rotation center side and on an inner circumference side of the heat radiating section among end portions of each of the plurality of fin elements is formed with a first end edge which forms one of the plurality of first grooves and a second end edge which forms one of the plurality of second grooves, and
wherein the first end edge and the second end edge form an acute angle.

6. A wavelength conversion device comprising:
the rotary cooling device according to claim 1; and
a wavelength converter connected to the base as the cooling target that converts a wavelength of light incident on the wavelength converter.

7. A projector comprising:
the wavelength conversion device according to claim 6;
a light source that emits light incident on the wavelength converter;
a light modulator that modulates light emitted from the light source; and
a lens that projects the light modulated by the light modulator.

8. A light diffusing device comprising:
the rotary cooling device according to claim 1; and
a light diffusor connected to the base as the cooling target that diffuses light incident on the light diffusor.

9. A projector comprising:
the light diffusing device according to claim 8;
a light source that emits light incident on the light diffusor;
a light modulator that modulates light emitted from the light source; and
a lens that projects the light modulated by the light modulator.

10. A rotary cooling device comprising:
a rotating device;
a base connected to a cooling target and configured to be rotated by the rotating device; and
a heat radiating section disposed in the base and configured to radiate heat transmitted from the cooling target via the base, wherein
the heat radiating section includes:
 a plurality of first grooves extending from a rotation center side of the base to an outer circumference side of the base, arrayed along a rotating direction of the base, and communicating with an outer region of the heat radiating section when viewed along a rotation axis of the base;
 a plurality of second grooves crossing at least one of the plurality of first grooves; and
 a plurality of fin elements divided by the plurality of first grooves and the plurality of second grooves, the plurality of second grooves linearly extending from the rotation center side to the outer circumference side of the base and communicating with the outer region.

11. The rotary cooling device according to claim 10, wherein the plurality of first grooves are disposed at substantially equal intervals along the rotating direction and have a shape further warping in an opposite direction of the rotating direction from the rotation center side toward the outer circumference side of the base.

12. The rotary cooling device according to claim 10, wherein the plurality of first grooves and the plurality of second grooves are formed rotation-symmetrically around the rotation center.

13. The rotary cooling device according to claim 10, wherein a groove width of the plurality of first grooves is larger than a groove width of the plurality of second grooves.

14. The rotary cooling device according to claim 10,
wherein an end portion on the rotation center side and on an inner circumference side of the heat radiating section among end portions of each of the plurality of fin elements is formed with a first end edge which forms one of the plurality of first grooves and a second end edge which forms one of the plurality of second grooves, and
wherein the first end edge and the second end edge form an acute angle.

15. A wavelength conversion device comprising:
the rotary cooling device according to claim 10; and
a wavelength converter connected to the base as the cooling target that converts a wavelength of light incident on the wavelength converter.

16. A projector comprising:
the wavelength conversion device according to claim 15;
a light source configured to emit light incident on the wavelength converter;
a light modulator that modulates light emitted from the light source; and
a lens that projects the light modulated by the light modulator.

17. A light diffusing device comprising:
the rotary cooling device according to claim 10; and
a light diffusor connected to the base as the cooling target that diffuses light incident on the light diffusor.

18. A projector comprising:
the light diffusor according to claim 17;
a light source that emits light incident on the light diffusor;
a light modulator that modulates light emitted from the light source; and
a lens that projects the light modulated by the light modulator.

\* \* \* \* \*